United States Patent
Murakami

(10) Patent No.: US 8,961,346 B2
(45) Date of Patent: Feb. 24, 2015

(54) DAMPER DEVICE

(71) Applicant: Fuji Jukogyo Kabushiki Kaisha, Tokyo (JP)

(72) Inventor: Mamoru Murakami, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/197,094

(22) Filed: Mar. 4, 2014

(65) Prior Publication Data

US 2014/0274524 A1   Sep. 18, 2014

(30) Foreign Application Priority Data

Mar. 13, 2013  (JP) .................. 2013-050700

(51) Int. Cl.
  *F16H 47/08* (2006.01)
  *F16F 15/14* (2006.01)
(52) U.S. Cl.
  CPC .................... *F16F 15/1478* (2013.01)
  USPC ............................. 475/71; 475/347
(58) Field of Classification Search
  USPC ............ 475/31, 33, 35, 36, 59, 65, 71, 346, 475/347; 192/3.28, 3.29, 56.61, 212, 213
  See application file for complete search history.

(56) References Cited

U.S. PATENT DOCUMENTS

| | | | | |
|---|---|---|---|---|
| 5,334,112 A | * | 8/1994 | Nogle et al. | 475/59 |
| 6,826,974 B2 | * | 12/2004 | Kobayashi | 74/339 |
| 2002/0169047 A1 | * | 11/2002 | Hiraku et al. | 475/206 |
| 2003/0183467 A1 | * | 10/2003 | Kozarekar | 188/380 |
| 2006/0063632 A1 | * | 3/2006 | Hiraku et al. | 475/214 |
| 2008/0119316 A1 | * | 5/2008 | Ordo | 475/59 |
| 2013/0203541 A1 | * | 8/2013 | Lorenz et al. | 475/59 |
| 2013/0244800 A1 | | 9/2013 | Sakai et al. | |

FOREIGN PATENT DOCUMENTS

WO    WO 2012/066680 A1    5/2012

* cited by examiner

*Primary Examiner* — Justin Holmes
(74) *Attorney, Agent, or Firm* — McGinn IP Law Group, PLLC

(57) ABSTRACT

A damper device is disposed between an engine and a transmission. The damper device includes a differential mechanism. The differential mechanism includes a first input element connected to the engine, a second input element connected to the engine, and an outputting element connected to the transmission. The damper device also includes a first spring disposed between the engine and the first input element, an inertia member disposed between the first spring and the first input element, and a second spring disposed between the transmission and the outputting element.

15 Claims, 7 Drawing Sheets

DAMPER DEVICE

CROSS-REFERENCE TO RELATED APPLICATION(S)

The present application claims priority from Japanese Patent Application No. 2013-050700 filed on Mar. 13, 2013, the entire contents of which are hereby incorporated by reference.

TECHNICAL FIELD

The present disclosure relates to a damper device disposed between an engine and a transmission.

BACKGROUND OF THE INVENTION

In order to reduce torsional vibration transmitted from an engine to a transmission, a damper device is disposed between the engine and the transmission. As such a damper device, a damper device provided with two flywheels coupled via a spring has been proposed (see PCT International Publication No. WO2012/66680). The torsional vibration of the engine can be suppressed by coupling the two flywheels via the spring. A conventional damper device is designed by adjusting mass and a spring constant of each member which constitutes the damper device to offset a resonance point (specific frequency) of the damper device from a commonly-used range of engine speed. However, it is difficult to offset the resonance point of the damper device from such a broad range from a low speed to a high speed only by adjusting the mass and the spring constant of the damper device. Therefore, when the conventional damper device is used, it is difficult to suppress the torsional vibration of the engine in such a broad range.

SUMMARY OF THE INVENTION

The present disclosure has been designed in consideration of the circumstances described above, and an object thereof is to provide a damper device capable of suppressing torsional vibration of an engine in a broad range.

An aspect of the present disclosure provides a damper device disposed between an engine and a transmission is provided. The damper device includes a differential mechanism including a first input element connected to the engine, a second input element connected to the engine, and an outputting element connected to the transmission. The damper device also includes a first elastic member disposed between the engine and the first input element, an inertial mass body disposed between the first elastic member and the first input element, and a second elastic member disposed between the transmission and the outputting element.

BRIEF DESCRIPTION OF DRAWINGS

The present disclosure is illustrated by way of example and not by way of limitation in the figures of the accompanying drawings, in which the like reference numerals indicate like elements and in which.

DETAILED DESCRIPTION

Figure 1:
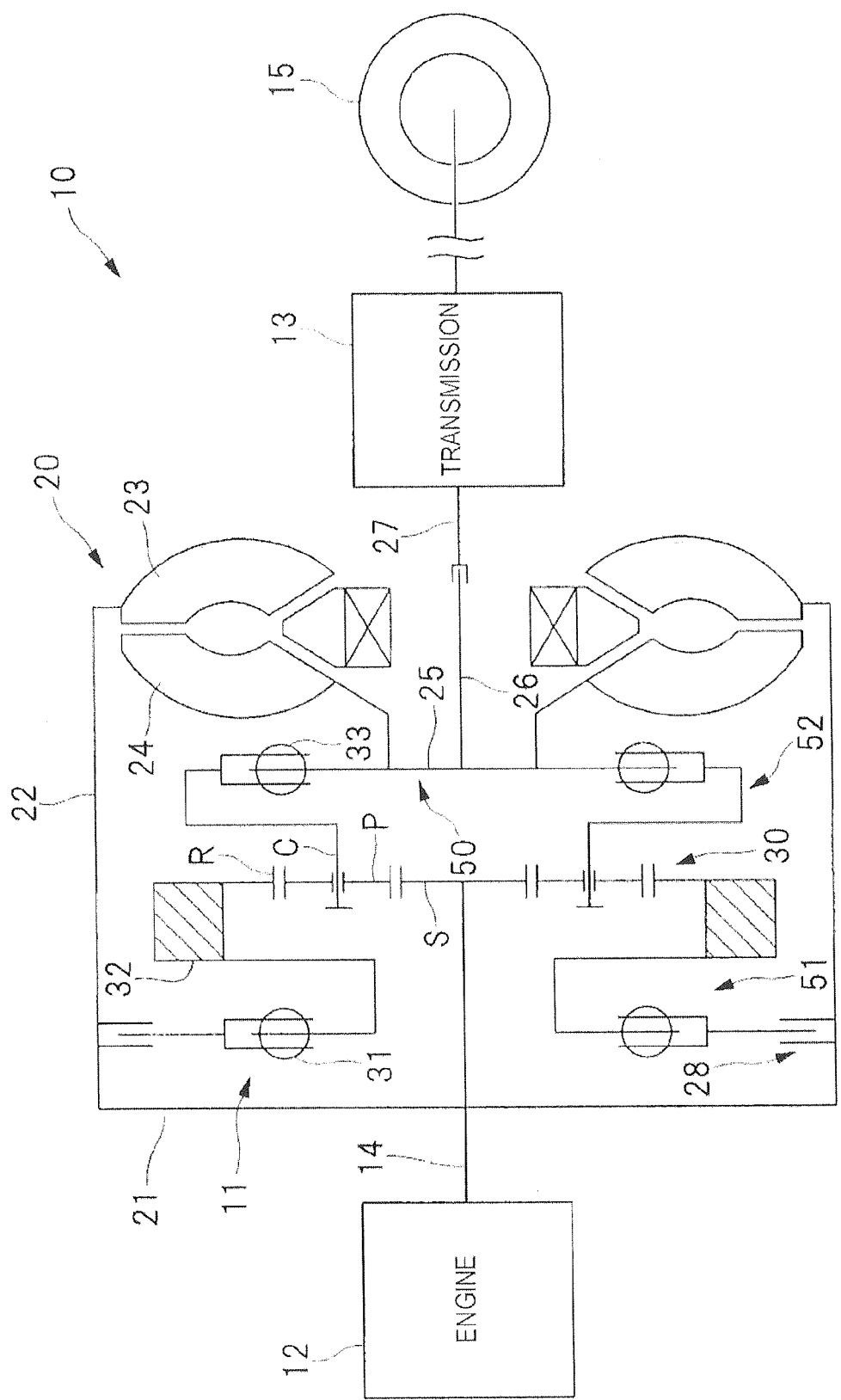
FIG. 1 is a schematic diagram illustrating a power unit mounted on a vehicle.

Hereinafter, an implementation of the present disclosure is described in detail based on the accompanying drawings. FIG. 1 is a schematic diagram illustrating a power unit 10 mounted on a vehicle. A damper device 11 which is an implementation of the present disclosure is assembled to the power unit 10 illustrated in FIG. 1. As illustrated in FIG. 1, the power unit 10 includes an engine 12 which is an internal combustion engine, and a transmission 13 connected to the engine 12 via the damper device 11. Thus, the damper device 11 is disposed between the engine 12 and the transmission 13, and the damper device 11 is used to damp torsional vibration which originates in vibrating forces of the engine 12. Note that the torsional vibration of the engine 12 means a torque variation resulting from, for example, combustion vibrating forces and unbalance inertial forces which act on a crankshaft 14 of the engine 12. Further, driving wheels 15 are connected to the transmission 13 via a differential device (not illustrated).

A torque converter 20 is disposed between the engine 12 and the transmission 13, and the damper device 11 is accommodated in the torque converter 20. The torque converter 20 includes a front cover 21 coupled to the crankshaft 14, and a pump shell 22 fixed to the front cover 21. The torque converter 20 also includes a pump impeller 23 fixed to the pump shell 22, and a turbine runner 24 which opposes to the pump impeller 23. A turbine hub 25 is coupled to the turbine runner 24, and a turbine shaft 26 is coupled to the turbine hub 25. The transmission 13 is connected with the turbine shaft 26 via a transmission input shaft 27. Further, a lock-up clutch 28 which can be switched between an engaging state and a disengaging state is provided to the torque converter 20. Switching the lock-up clutch 28 to the disengaging state causes the front cover 21 and the turbine shaft 26 to enter a state where they are coupled to each other via the torque converter 20. On the other hand, switching the lock-up clutch 28 to the engaging state causes the front cover 21 and the turbine shaft 26 to enter a state where they are coupled to each other via the damper device 11. That is, the engine 12 and the transmission 13 are coupled to each other via the torque converter 20 by disengaging the lock-up clutch 28, while the engine 12 and the transmission 13 are coupled to each other via the damper device 11 by engaging the lock-up clutch 28.

The damper device 11 is provided with a differential mechanism 30 comprised of a planetary gear train. The differential mechanism 30 has a ring gear R (first input element) connected to the front cover 21 via the lock-up clutch 28, and a first spring 31 (first elastic member or spring member). That is, the ring gear R is connected to the crankshaft 14 of the engine 12, and the first spring 31 is disposed between the crankshaft 14 and the ring gear R. Between the first spring 31 and the ring gear R, an inertia member 32 (inertial mass body) having a predetermined mass is disposed. The differential mechanism 30 also includes a sun gear S (second input element) connected with the crankshaft 14, a pinion gear P which meshes with the ring gear R and the sun gear S, and a career C (outputting element) rotatably supporting the pinion gear P. Between the career C and the turbine hub 25, a second spring 33 (second elastic member or spring member) is disposed. The spring constant of the second spring 33 is set to or below the spring constant of the first spring 31.

Figure 2:
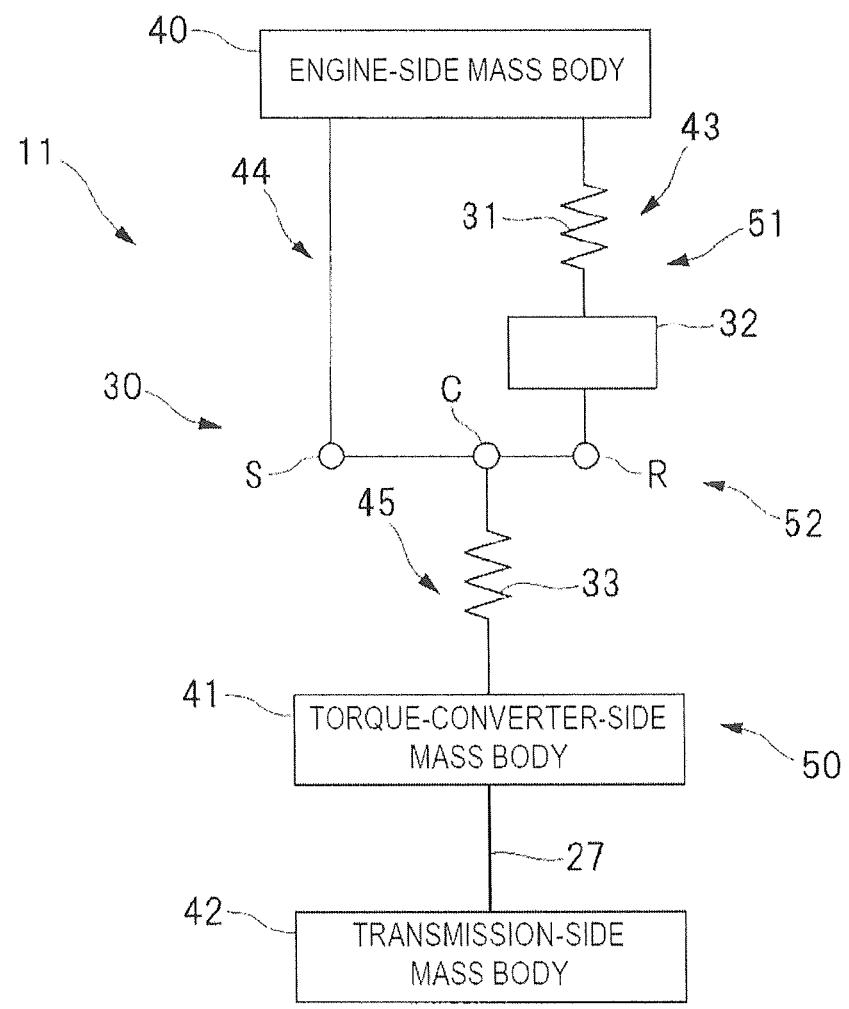
FIG. 2 is a diagram illustrating a structural model of a damper device.
Figure 3:
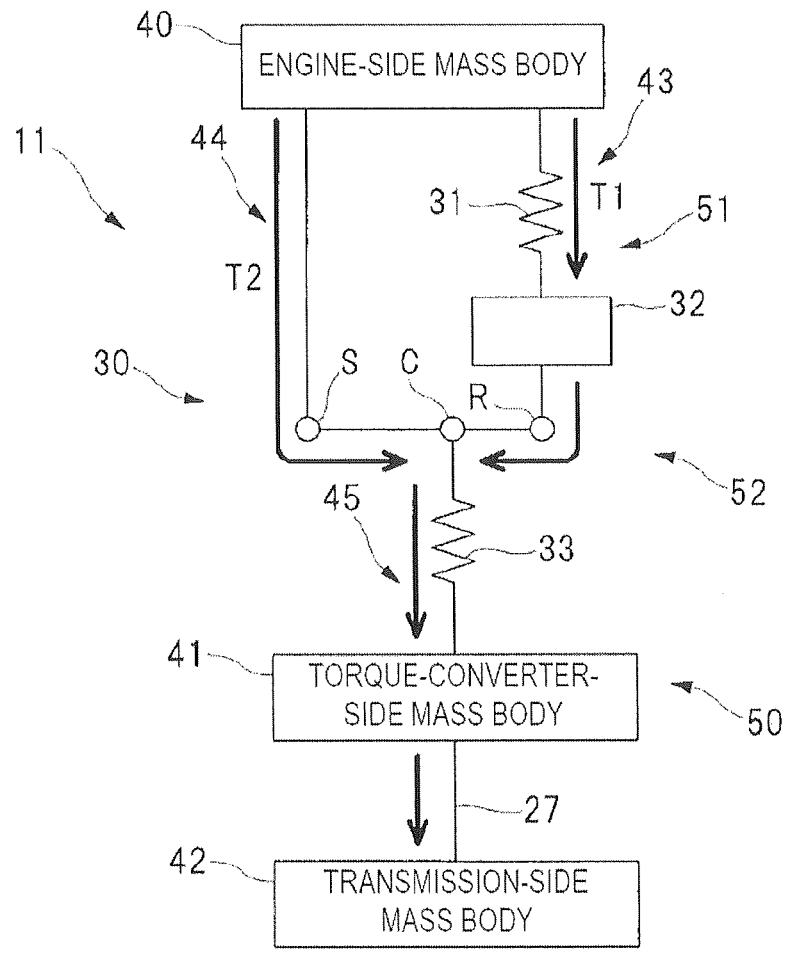
FIG. 3 is a diagram illustrating a transmitting situation of an engine torque from an engine to a transmission via the damper device.

FIG. 2 is a diagram illustrating a structural model of the damper device 11. Note that FIG. 2 illustrates the structural model in a state where the lock-up clutch 28 is engaged. An engine-side mass body 40 is a rotary mass body coupled to the engine 12 side, and the engine-side mass body 40 is comprised of the crankshaft 14, the front cover 21, and the pump shell 22. Further, a torque-converter-side mass body 41 is a rotary mass body coupled to the output side of the torque converter 20, and the torque-converter-side mass body 41 is comprised of the turbine runner 24, the turbine hub 25, and the turbine shaft 26. Further, a transmission-side mass body 42 is a rotary mass body coupled to the transmission input shaft 27, and the transmission-side mass body 42 is comprised of rotation shafts and gears (not illustrated) inside the transmission 13. FIG. 3 is a diagram illustrating a transmitting situation of an engine torque transmitted from the engine 12 to the transmission 13 via the damper device 11.

As illustrated in FIG. 2, the differential mechanism 30 is provided with two input paths 43 and 44 for inputting the engine torque, and an output path 45 for outputting the engine torque. That is, in the differential mechanism 30, the first input path 43 is formed to input the engine torque into the ring gear R via the first spring 31, and the second input path 44 is formed to input the engine torque into the sun gear S. Thus, since the first spring 31 is provided in the first input path 43, the first spring 31 can be expanded and contracted according to the torsional vibration of the engine 12, and the ring gear R and the sun gear S can be rotated relatively to each other. Further, in the differential mechanism 30, the output path 45 is formed to output the engine torque from the career C via the second spring 33. Thus, since the second spring 33 is provided in the output path 45, a resonance point (specific frequency) of a vibration system 50 comprised of the torque-converter-side mass body 41 is lowered to a low frequency range side as described later.

As illustrated in FIG. 3, since the two input paths 43 and 44 are connected to the differential mechanism 30, engine torques T1 and T2 are inputted into the differential mechanism 30 from both the input paths 43 and 44. Further, the engine torques T1 and T2 are outputted to the transmission 13 via the career C and the output path 45 after the engine torques T1 and T2 are synthesized in the differential mechanism 30. Here, a vibration system 51 comprised of the first spring 31 and the inertia member 32 is provided in the first input path 43. Thus, a phase offset occurs between the torsional vibration of the engine torque T1 transmitted via the first input path 43 and the torsional vibration of the engine torque T2 transmitted via the second input path 44. That is, in a frequency range lower than the resonance point of the vibration system 51, the sun gear S and the ring gear R vibrate in the same phase, and thus the torsional vibration synthesized in the differential mechanism 30 is amplified. On the other hand, in a frequency range higher than the resonance point of the vibration system 51, the sun gear S and the ring gear R vibrate in 180° out of phase, and thus the torsional vibration synthesized in the differential mechanism 30 is damped. Note that a distribution ratio of the engine torque T2 and the engine torque T1 which cancels out the torsional vibration of the engine torque T2 may be set based on the number of teeth of the ring gear R and the sun gear S.

Figure 4:
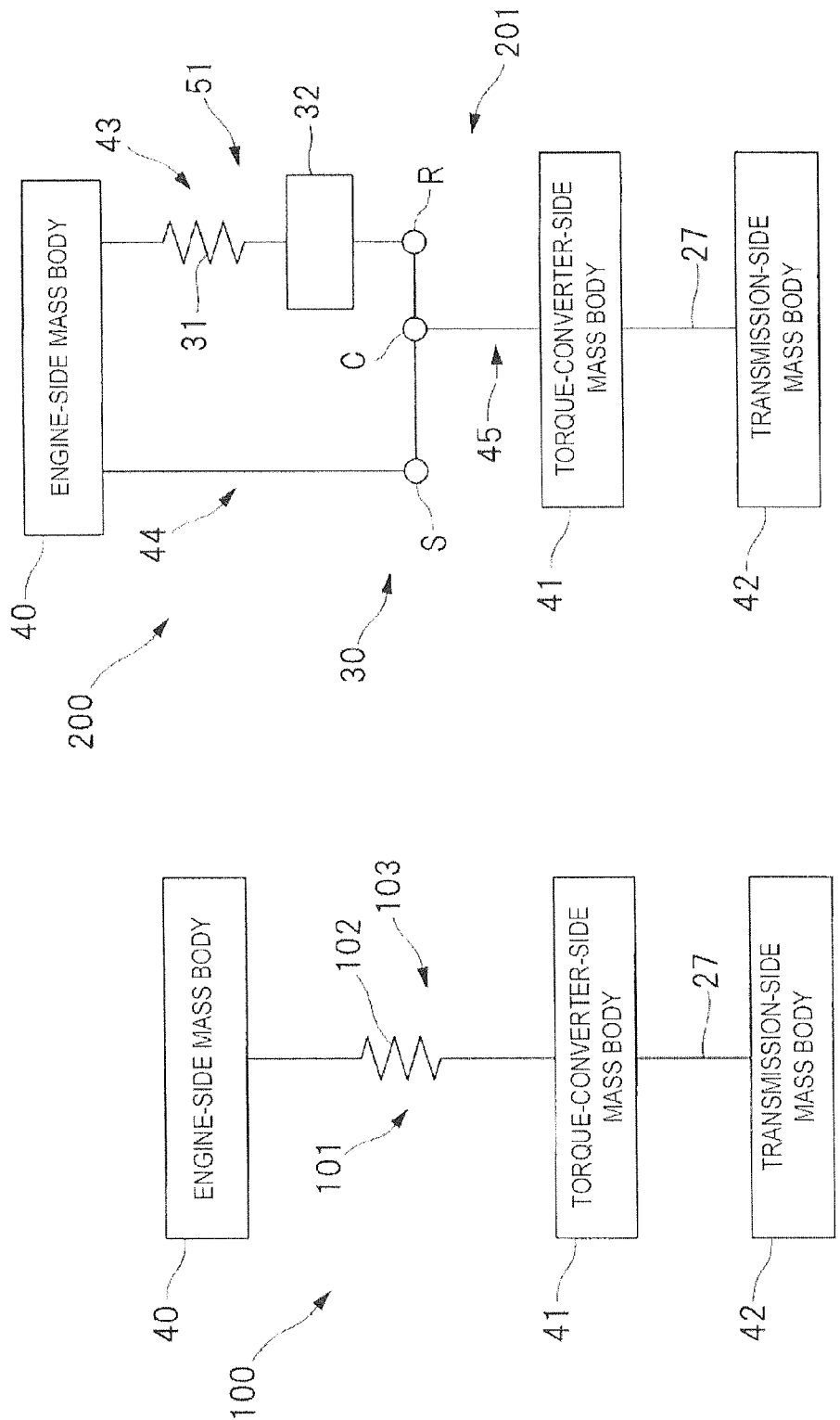
FIGS. 4A and 4B are diagrams illustrating structural models of damper devices as comparative examples.
Figure 5:
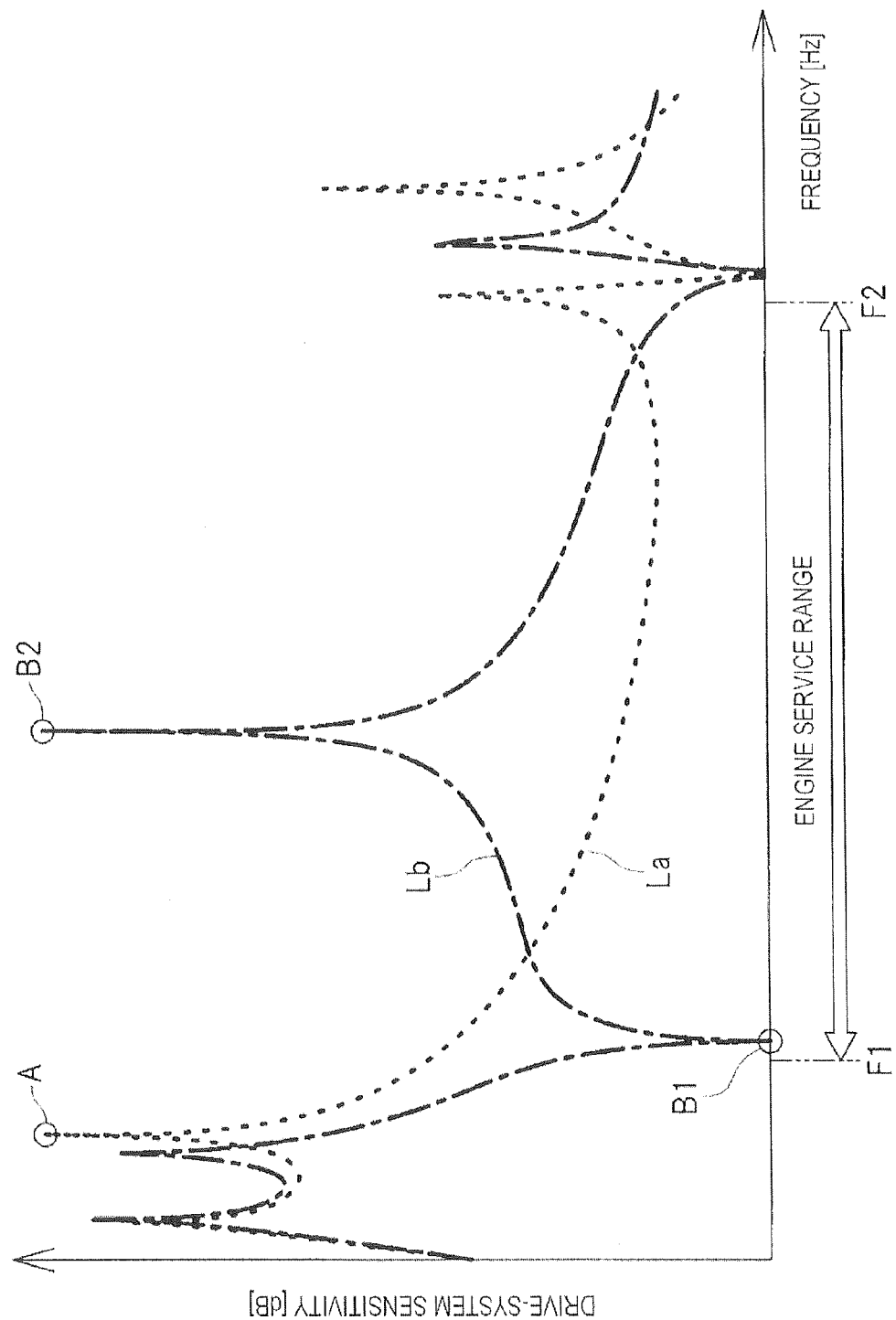
FIG. 5 is a comparison graph illustrating damping characteristics of the damper devices.
Figure 6:
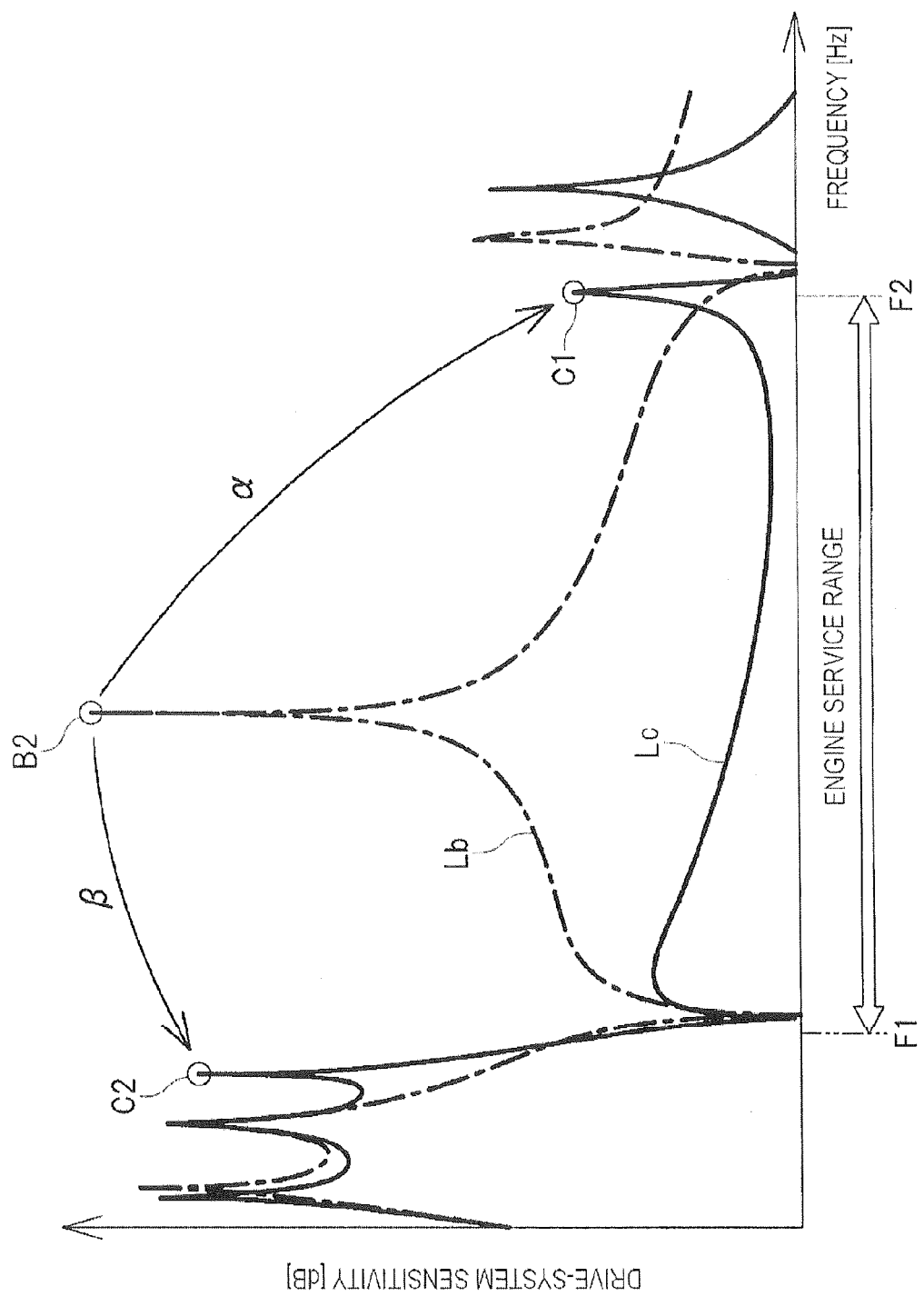
FIG. 6 is a comparison graph illustrating damping characteristics of the damper devices.
Figure 7:
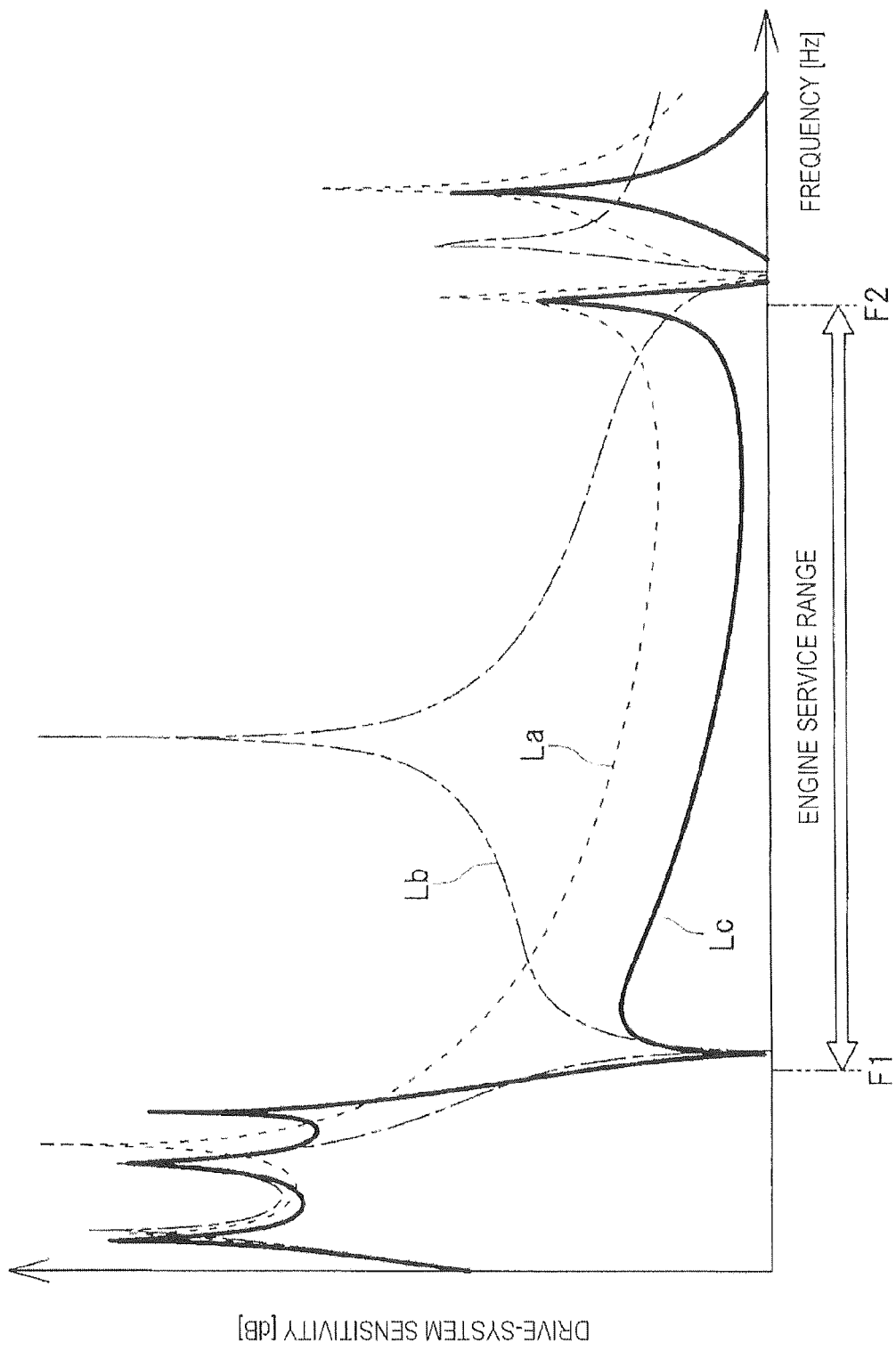
FIG. 7 is a comparison graph illustrating damping characteristics of the damper devices.

Damping characteristics of the damper device 11 which is an implementation of the present disclosure will be described after describing damping characteristics of damper devices 100 and 200 which are comparative examples. Here, FIGS. 4A and 4B are diagrams illustrating structural models of the damper devices 100 and 200 as the comparative examples. Note that, in FIGS. 4A and 4B, members similar to the members illustrated in FIG. 3 are denoted with the same numerals and the description thereof is omitted. FIG. 5 is a comparison graph illustrating damping characteristics of the damper devices 100 and 200, FIG. 6 is a comparison graph illustrating damping characteristics of the damper devices 11 and 200, and FIG. 7 is a comparison graph illustrating damping characteristics of the damper devices 11, 100 and 200. In FIGS. 5 to 7, the horizontal axes indicate the number of vibrations, i.e., a frequency of the torsional vibration, and the vertical axes indicate a drive-system sensitivity which is a vibration acceleration level of the torsional vibration. Note that, in FIGS. 5 and 7, a characteristic curve La drawn by a dashed line indicates a damping characteristic obtained by the damper device 100. In FIGS. 5, 6 and 7, a characteristic curve Lb drawn by a dashed dotted line indicates a damping characteristic obtained by the damper device 200. In FIGS. 6 and 7, a characteristic curve Lc drawn by a solid line indicates a damping characteristic obtained by the damper device 11.

As illustrated in FIG. 4A, in the damper device 100, the engine-side mass body 40 and the torque-converter-side mass body 41 are coupled to each other via a single input path 101, and a spring 102 is incorporated into the input path 101. In the damper device 100, the spring constant of the spring 102 small is set to lower the resonance point of a vibration system 103 so that the resonance point of the vibration system 103 is offset from the frequency range equivalent to an engine service range, as illustrated in FIG. 5 by a character "A." Note that the engine service range illustrated in FIGS. 5 to 7 is a frequency range defined with a lower limit frequency F1 corresponding to an idle speed of the engine 12 and an upper limit frequency F2 corresponding to an allowable upper limit of the engine speed.

As illustrated in FIG. 4B, the damper device 200 is provided with a differential mechanism 30 between the engine-side mass body 40 and the torque-converter-side mass body 41. The differential mechanism 30 has the ring gear R connected to the engine-side mass body 40 via the first spring 31 and the inertia member 32, and the sun gear S connected to the engine-side mass body 40. The differential mechanism 30 also has the career C directly coupled with the torque-converter-side mass body 41. That is, the damper device 200 has a structure where the second spring 33 is omitted from the output path 45 of the damper device 11. The damper device 200 includes two input paths 43 and 44 connected to the differential mechanism 30 and also includes the vibration system 51 provided in the first input path 43. Accordingly, as illustrated in FIG. 5 by a symbol "B 1," the sun gear S and the ring gear R vibrate in 180° out of phase from each other in the frequency range above the resonance point of the vibration system 51, and thus the torsional vibration can be greatly reduced, exceeding the damping performance of the damper device 100 described above. However, the damper device 200 has a structure in which the differential mechanism 30 and the inertia member 32 are coupled to the torque-converter-side mass body 41. That is, in a vibration system 201 comprised of the torque-converter-side mass body 41, the differential mechanism 30, and the inertia member 32, the mass increases, and thus, as illustrated in FIG. 5 by a symbol "B2," the resonance point of the vibration system 201 is in a state where it is lowered into the engine service range.

As described above, incorporating the differential mechanism 30, the inertia member 32, etc results in suitable damping characteristics of the damper device 200, as illustrated in FIG. 5 by a symbol "B1". However, since the mass of the vibration system 50 increases in connection with the incorporation of, for example, the differential mechanism 30, the torsional vibration is amplified within the engine service range, as illustrated in FIG. 5 by the symbol "B2". Thus, in the damper device 11 which is an implementation of the present disclosure, in order to suppress the amplification of the torsional vibration in the engine service range, the second spring 33 is disposed between the career C and the torque-converter-side mass body 41, as illustrated in FIG. 2. Hereinafter, the effects obtained by the second spring 33 will be described.

Since the second spring 33 is provided in the output path 45 as illustrated in FIG. 2, the differential mechanism 30 and the inertia member 32 can be separated from the vibration system 50 comprised of the torque-converter-side mass body 41. That is, it is possible to reduce the mass of the vibration system 50 comprised of the torque-converter-side mass body 41 and the second spring 33, the mass affecting the resonance point of the vibration system 50. Thus, as illustrated in FIG. 6 by an arrow α and a symbol "C1," the resonance point of the vibration system 50 can be pulled up to a high frequency range so that the resonance point is offset outside the engine service range. In addition, since the second spring 33 having the same or a less spring constant than that of the first spring 31 is provided in the output path 45, the resonance point of the vibration system 52 comprised of the second spring 33, the differential mechanism 30, and the inertia member 32 can be lowered as illustrated in FIG. 6 with an arrow β and a symbol "C2." In other words, the soft second spring 33 to a vibration system 52 is added, whereby it is possible to lower the resonance point of the vibration system 52 to a low frequency range so that the resonance point is offset outside the service range of the engine 12.

As described above, the second spring 33 disposed between the transmission 13 and the career C enables a resonance point B2 of the damper device 200 which appears in the engine service range to be divided into a resonance point C1 on the high frequency range side and a resonance point C2 on the low frequency range side, as illustrated in FIG. 6 with the arrows α and β, respectively. Thus, as illustrated in FIG. 7 with the characteristic curves La to Lc, the damper device 11 can suppress the resonance of the torsional vibration in the engine service range more than the damper devices 100 and 200, and therefore, vibration and noise can be suppressed to improve a vehicle quality. In addition, since the suppression of the torsional vibration of the engine 12 leads to the suppression of hollow sound at the time of traveling at low speed, it is possible to engage the lock-up clutch 28 from the low vehicle speed range, thereby improving a fuel consumption performance of the vehicle. The suppression of the torsional vibration of the engine 12 also leads to the suppression of the load which acts on the transmission 13, thereby improving durability of the transmission 13. Further, the suppression of the torsional vibration of the engine 12 can decrease the number of cylinders of the engine 12, and lower the service range of the engine speed, thereby improving the fuel consumption performance of the vehicle.

In the above, the damper device 11 is accommodated in the torque converter 20 to which hydraulic fluid is supplied. Such accommodation can suitably lubricate the differential mechanism 30 constituting the damper device 11. However, the installing location of the damper device 11 is not limited to inside the torque converter 20, and the damper device 11 may be installed separately from the torque converter 20. Further, the vehicle on which the damper device 11 is mounted is not limited to a vehicle provided with the torque converter 20. The damper device 11 can effectively be applied to a vehicle without the torque converter 20.

In the above, although the spring constant of the second spring 33 is set to or below the spring constant of the first spring 31, the present disclosure is not limited to this. For example, if the resonance point of the vibration system 52 can be lowered by adjusting the mass of, for example, the differential mechanism 30 or the inertia member 32, as illustrated in FIG. 6 by the symbol "C2" so that the resonance point is offset outside the engine service range, the spring constant of the second spring 33 may be set above the spring constant of the first spring 31.

In the above, although the ring gear R functions as the first input element and the sun gear S functions as the second input element, the present disclosure is not limited to this. For example, the sun gear S or the career C may function as the first input element, and the ring gear R or the career C may function as the second input element. Further, although the career C functions as the outputting element, the present disclosure is not limited to this. Alternatively, the ring gear R or the sun gear S may function as the outputting element.

In the above, the differential mechanism 30 is constituted by the simple planetary gear train. Alternatively, the differential mechanism 30 may be constituted by a compound planetary gear train in which multiple simple planetary gear trains are coupled. Further, in the above, the differential mechanism 30 is constituted by the planetary gear train provided with one pinion gear P. Alternatively, the differential mechanism 30 may be constituted by a planetary gear train provided with the compound pinion gear comprised of a plurality of pinion gears. Further, in the above, the differential mechanism 30 is constituted by the planetary gear train. Alternatively, the differential mechanism 30 may be constituted using bevel gears, etc.

Thus, the present disclosure is not limited to the above implementation, and may be changed variously without departing from the scope thereof. In the above, the springs 31 and 33 are described as the elastic members. Alternatively, rubber members may be adopted as the elastic members. Further, the transmission 13 may be a stick-shift (or manual) transmission or a continuously variable transmission (CVT), and may be an automatic transmission of planetary gear type or parallel shaft type. Further, the engine 12 may be a gasoline engine or a diesel engine without prejudice.

In the foregoing specification, specific implementation s of the present disclosure have been described. However, one of ordinary skill in the technique appreciates that various modifications and changes can be performed without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A damper device disposed between an engine and a transmission, comprising:
   a differential mechanism including a first input element connected to the engine, a second input element connected to the engine, and an outputting element connected to the transmission;
   a first elastic member disposed between the engine and the first input element;

an inertial mass body disposed between the first elastic member and the first input element; and a second elastic member disposed between the transmission and the outputting element, wherein the first elastic member and the second elastic member comprise spring members, and a spring constant of the second elastic member is set to or below a spring constant of the first elastic member.

2. The damper device of claim 1, wherein the differential mechanism is accommodated in a torque converter.

3. The damper device of claim 2, wherein a lock-up clutch is disposed between the engine and the first elastic member.

4. The damper device of claim 2, wherein the torque converter includes a pump impeller connected to the engine, and a turbine runner opposing to the pump impeller, and wherein the second elastic member is disposed between the outputting element and the turbine runner.

5. The damper device of claim 4, wherein a lock-up clutch is disposed between the engine and the first elastic member.

6. The damper device of claim 1, wherein a resonance point of the differential mechanism is offset from a frequency range of the engine.

7. The damper device of claim 1, wherein a resonance point of the differential mechanism is offset from an engine service frequency range.

8. The damper device of claim 1, wherein a mass of the second elastic member, the differential mechanism, and the inertial mass body is set such that a resonance point of the differential mechanism is offset from a frequency range of the engine.

9. A damper device disposed between an engine and a transmission, comprising:

a differential mechanism including a first input element connected to the engine, a second input element connected to the engine, and an outputting element connected to the transmission;

a first elastic member disposed between the engine and the first input element;

an inertial mass body disposed between the first elastic member and the first input element; and a second elastic member disposed between the transmission and the outputting element, wherein the first elastic member and the second elastic member comprise spring members, and a spring constant of the second elastic member is set in relation to a spring constant of the first elastic member such that a resonance point of the differential mechanism is offset from a frequency range of the engine.

10. The damper device of claim 9, wherein the spring constant of the second elastic member is set to or below the spring constant of the first elastic member.

11. The damper device of claim 9, wherein the spring constant of the second elastic member is set above the spring constant of the first elastic member.

12. The damper device of claim 9, wherein the differential mechanism is accommodated in a torque converter.

13. The damper device of claim 12, wherein a lock-up clutch is disposed between the engine and the first elastic member.

14. The damper device of claim 12, wherein the torque converter includes a pump impeller connected to the engine, and a turbine runner opposing to the pump impeller, and wherein the second elastic member is disposed between the outputting element and the turbine runner.

15. The damper device of claim 14, wherein a lock-up clutch is disposed between the engine and the first elastic member.

* * * * *